Sept. 30, 1969   M. SAGALOW   3,469,309
METHOD OF MANUFACTURING SQUIRREL-CAGE ROTOR
Original Filed March 1, 1965
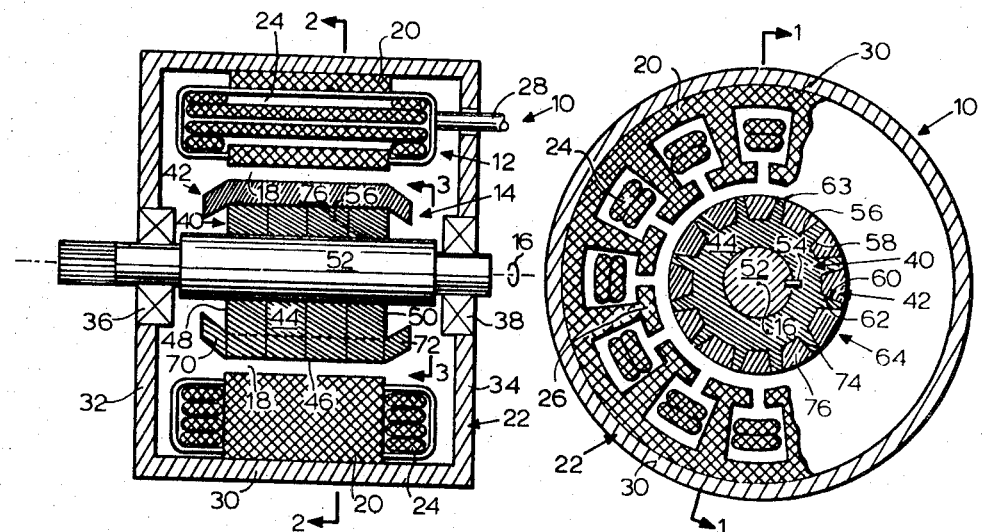
FIG. 1   FIG. 2
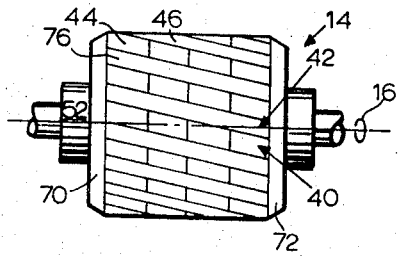
FIG. 4
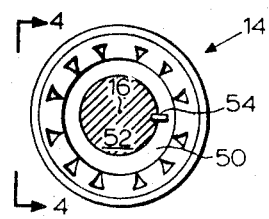
FIG. 3
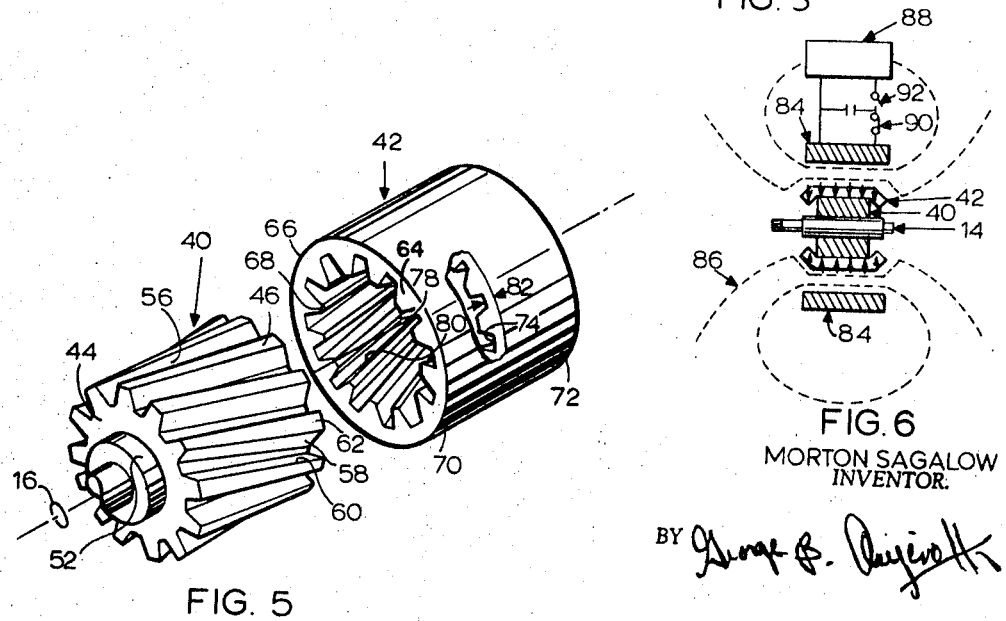
FIG. 5
FIG. 6
MORTON SAGALOW
INVENTOR.
BY George B. Oujevolk
ATTORNEY United States Patent Office 3,469,309
Patented Sept. 30, 1969

3,469,309
METHOD OF MANUFACTURING SQUIRREL-CAGE ROTOR
Morton Sagalow, West Orange, N.J., assignor to Singer-General Precision, Inc., Little Falls, N.J., a corporation of Delaware
Original application Mar. 1, 1965, Ser. No. 436,111, now Patent No. 3,360,669, dated Dec. 26, 1967. Divided and this application July 19, 1967, Ser. No. 663,911
Int. Cl. B23p *17/00;* H02k *15/02*
U.S. Cl. 29—598                                    1 Claim

ABSTRACT OF THE DISCLOSURE

A squirrel-cage rotor is made by positioning a hollow tube with inwardly projecting elongated projections over a core with corresponding grooves, the ends of the tube overhanging the core, and, applying a high-intensity pressure to the tube radially-outer surface to cause the tube projections to fill the core grooves.

---

This invention relates to squirrel-cage induction motors, and particularly to a rotor for a squirrel-cage motor and a method of manufacture thereof.

A conventional squirrel-cage induction motor has an outer stator body and an inner rotor body rotatable relative to the stator. The stator has a coil support with a plurality of radial teeth, which are wound with field coils. The rotor, which is journaled in the stator, has an iron core which supports a conductor cage. The cage, which has a squirrel-cage shape, has a plurality of peripherally-spaced conductive bars connected to a pair of end rings.

A conventional method of manufacturing such a squirrel-cage rotor includes the steps of temporarily mounting the cage bars on the iron core and then die-casting the cage end rings to the bars. One problem with such method is the formation of voids in the cast parts thereby minimizing the strength of the rotor, and repeatability in manufacture.

In accordance with one embodiment of the present invention, squirrel-cage rotors without cast parts can be manufactured by a method including the steps of positioning a tube of predetermined design over an iron core of predetermined design, and then applying a predetermined high-intensity pulsed magnetic field over the exterior surface of the tube. A magnetic-pulse forming device, which can provide such field, is described in U.S. Patent No. 2,976,907.

Accordingly, it is one object of the invention to eliminate cast parts in a squirrel-cage rotor.

It is another object of the invention to provide a squirrel-cage rotor having an iron core usable as a die for radially forming its one-piece cage.

It is a further object of the invention to provide a method of manufacture of the aforementioned squirrel-cage rotor using the operation of magnetic-pulse forming.

To the fulfillment of these and other objects, a squirrel-cage rotor comprising a metal tube with a longitudinal axis and a metal core which coaxially supports said tube is provided. The tube has a pair of axially-spaced annular end portions and has a plurality of peripherally-spaced elongate slots forming therebetween bars of trapezoidal cross-section for interconnecting said end portions. The core has a pair of end faces respectively abutting said tube end portions and has a plurality of peripherally-spaced grooves with radially-outwardly-diverging groove side walls for receiving said tube bars.

Other objects of the invention will become apparent upon reading the annexed detailed description in connection with the drawings wherein like parts are designated by like numerals throughout the several views, and wherein:

FIG. 1 is a sectional view of a squirrel-cage motor embodying features of the invention;

FIG. 2 is a sectional view as taken on line 2—2 of FIG. 1;

FIG. 3 is a sectional view as taken on line 3—3 of FIG. 1;

FIG. 4 is a sectional view as taken on line 4—4 of FIG. 3;

FIG. 5 is an isometric view of a portion of FIG. 1 prior to the manufacture thereof; and FIG. 6 is a schematic view of said portion of FIG. 1 during the manufacture thereof.

Referring to the drawings, one embodiment of the present invention is a motor 10, comprising a stator or outer body 12 and a rotor or inner body 14, which is rotatable relative thereto about a longitudinal axis 16 and which is separated therefrom in a radial direction by a narrow annular gap 18.

Stator 12 comprises an annular coil support 20, which is coaxially mounted in a cylindrical housing 22, and also a plurality of field coils 24, which are supported from coil support 20 and which are peripherally spaced about axis 16.

Coil support 20 (FIG. 2), which is normally a laminated-iron construction, has a plurality of radially-inwardly pointing T-shaped teeth 26 on which coils 24 are wrapped in a conventional manner. Coils 24 (FIG. 1) have a power supply lead 28, which extends through housing 22.

Housing 22 includes a peripheral wall 30 and a pair of axially-spaced end walls 32, 34, which enclose coils 24. Walls 32, 34 respectively have coaxial bearings 36, 38.

Rotor 14 comprises a metal core 40 and a coaxial tube 42. Core 40 (FIGS. 1, 2) has an annular laminated iron portion 44 with a radially outer surface 46 that is concentric about axis 16 and with a pair of axially-spaced end faces 48, 50. Core 40 also has a shaft portion 52, which is joined to annular portion 44 by a key member 54 and which is journaled in bearings 36, 38 for rotation relative to stator 12.

Radially outer surface 46 (FIGS. 2, 5) has a plurality of peripherally spaced helical grooves 56 with radially-outwardly-diverging groove side walls 58, 60 for forming a plurality of helical apex portions 62 therebetween. Apex portions 62 respectively have radially-outwardly-facing tip portions 63.

Tube 42 (FIGS. 2, 5) has a wall 64 with a concentric radially outer surface 66 and a radially inner surface 68 and with axially-spaced end portions 70, 72, which overlap end faces 48, 50, respectively. Wall 64 has a plurality of slots or grooves 74, which extend through outer surface 66 and inner surface 68. Slots 74 have a similar angular spacing and a similar helical pitch as those of apex portions 62. Wall 64 has a plurality of bar portions 76, which are respectively interspaced between grooves 74 and which interconnect end portions 70, 72.

Slots 74 have oppositely-facing radially-inwardly-diverging side walls 78, 80 whereby bars 76 have a trapezoidal cross-section. Slots 74 have bottom wall or web portions 82 (FIG. 5), at least a portion of which overlies the tip 63 of the adjacent apex 62. Bars 76 are respectively received in grooves 56 and preferably do not extend radially outwardly of surface 46.

With the above-described structure of rotor 14, a certain type of forming operation, as explained hereafter, can be used for the redistribution of the wall thickness of the tube and for the reshaping of the individual portions of the tube wall 64. In this way, manufacture of tube 42 and assembly of tube 42 and core 40 is facilitated.

The method of manufacture of rotor 14, according to the invention, includes the following steps of operations, which preferably follow the sequence as indicated in the following paragraphs.

A hollow metal tube 42 is fabricated with the longitudinal axis 16 and with the radially outer surface 66 and a radially inner surface 68 which define a tube wall 64. A plurality of peripherally spaced helical grooves 74 are machined in the radially outer surface 66 with radially-inwardly-diverging groove side walls 78, 80 so that thickened bar portions 76 are formed between grooves 74 and so that thinner web portions 82 are formed radially opposite grooves 74. Webs 82 are substantially thicker at the portions adjacent end portions 70, 72 than at their portions intermediate said ends 70, 72.

A laminated-iron core 40 is fabricated having a radially outer surface 46 which has a larger diameter than tube radially inner surface 68. A plurality of peripherally-spaced helical grooves 56 are machined in radially outer surface 46 with radially-outwardly-diverging groove side walls 58, 60 forming apex portions 62 therebetween. Grooves 56 and apexes 62 have substantially the same angular spacing and helical pitch as grooves 74. Core 40 is also shorter in axial length than tube 42.

Core 40 is inserted in tube 42 when positioned so that tube 42 has a substantially equal overhang at each end thereof, and so that apex portions 62 are received in respective grooves 74.

Tube 42 is disposed concentrically between core 40 and a hollow magnetic-pulse-forming conductor 84 of the type described in U.S. Patent No. 2,976,907, using core 40 as a die and using tube 42 as the workpiece. Conductor 84 has a charging circuit 88 with switches 90, 92. A predetermined high-intensity pulsed magnetic field 86 is applied by conductor 84 to radially outer surface 66. Field 86 has sufficient strength and is applied for a sufficient time to transfer the necessary energy to tube 42 and to cause groove side walls 78, 80 to bear against side walls 58, 60, respectively, and cause the material or stock of webs 82 and bars 76 to reform and fill adjacent respective grooves 56. In this way, radially outer surface 46 becomes the radially outer surface of rotor 14. Field 86 also causes respective tube ends 70, 72 to bend over and abut against end faces 48, 50. In this way ends 70, 72 are disposed radially inwardly of radially outer surface 46. Such redistribution of the material of webs 82 into respective adjacent grooves 56 is facilitated by the design of core 40 with its pointed apex portions 62 and by the design of tube 42 with its relatively thin webs 82. Before said forming operation (FIG. 5), webs 82 substantially overhang slots 74, while after such forming operation (FIG. 4), webs 82 do not substantially overhang slots 74, but rather are substantially disposed in grooves 56.

Using the aforementioned method of manufacture of squirrel-cage rotor 14 according to the invention, rotor cage 42 has the beneficial properties typical of wrought material whereby casting voids are substantially eliminated and other properties of the crystalline structure of the metal are improved, thereby assuring repeatability in the manufacture of precision squirrel-cage motors of a high performance standard.

While the present invention has been described in a preferred embodiment, it will be obvious to those skilled in the art that various modifications can be made therein within the scope of the invention. For example, slight projections from bars 76, which extend slightly in a radially outward direction from surface 46 can be machined-off to minimize slight variations in gap 18. In addition, the width in a peripheral direction of webs 82 can be substantially minimized prior to the aforementioned forming operation so that slots 74 would extend through outer surface 66 and so that tube 42 would have a cage-like shape prior to said forming operation. It is intended that the appended claim covers all such modifications.

What is claimed is:
1. The method of fabricating a squirrel-cage rotor, comprising the steps of:
  (a) machining, in a hollow metal tube which has a longitudinal axis, a radially outer surface and a radially inner surface defining a tube wall, a plurality of peripherally spaced helical first grooves in said radially outer surface with radially-inwardly-diverging first groove side walls so that thickened bar portions are formed between said first grooves and thinner web portions are formed radially opposite first grooves, web portions being substantially thinner at the portions adjacent the end portions than at portions intermediate said ends;
  (b) machining, in a laminated-iron-core shorter in axial length than tube which has a radially outer surface and which has a larger diameter than said tube radially inner surface, a plurality of peripherally spaced helical second grooves in said radially outer surface with radially-outwardly-diverging groove side walls and forming pointed apex portions therebetween, said second grooves and apexes having substantially the same angular spacing and helical pitch as said first grooves;
  (c) inserting said core in said tube so that when positioned, said tube has a substantially equal overhang at each end thereof, and so that apex portions are received in said respective first grooves;
  (d) disposing said tube concentrically between said core and a hollow magnetic-pulse-forming conductor so as to use said core as a die, and using said tube as the workpiece, applying by means of said conductor while using a charging circuit, a predetermined high-intensity pulsed magnetic field to radially outer surface of sufficient strength and applied for a sufficient time to transfer the necessary energy to said tube and to cause said first groove side walls to bear against said second side walls and cause the material of said webs and said bars to reform and fill adjacent respective grooves so that radially outer surface becomes the radially outer surface of the rotor, and field causing respective tube ends to bend over and abut against said end faces whereby said tube ends are disposed radially inwardly of radially outer surface, such redistribution of said webs into said respective adjacent second grooves being facilitated by pointed apex portions of said core, and by the relatively thin webs of said tube, said webs substantially overhanging said slots before said forming operation, but being substantially disposed in said second grooves after said forming operation.

References Cited

UNITED STATES PATENTS

| 2,998,638 | 9/1961 | MacLaren | 29—598 |
| 3,093,888 | 6/1963 | Huguley | 310—211 X |
| 3,175,383 | 3/1965 | Levine | 29—421 |
| 3,187,413 | 6/1965 | Vout et al. | 29—598 |
| 3,214,511 | 10/1965 | Franklin | 29—421 X |

JOHN F. CAMPBELL, Primary Examiner

CARL E. HALL, Assistant Examiner

U.S. Cl. X.R.

29—421, 432.2; 310—42